United States Patent [19]

Saitoh

[11] Patent Number: 5,452,012
[45] Date of Patent: Sep. 19, 1995

[54] IMAGE DISPLAY APPARATUS
[75] Inventor: Mitsumasa Saitoh, Kanagawa, Japan
[73] Assignee: Sony Corporation, Tokyo, Japan
[21] Appl. No.: 337,309
[22] Filed: Nov. 10, 1994

Related U.S. Application Data

[63] Continuation of Ser. No. 70,955, Jun. 4, 1993.

[30] Foreign Application Priority Data

Jun. 19, 1992 [JP] Japan .................. 4-185955

[51] Int. Cl.$^6$ ............... H04N 5/445; H04N 5/262; H04N 5/265; H04N 5/44
[52] U.S. Cl. ..................... 348/563; 348/569; 348/564
[58] Field of Search ............. 348/553, 563, 564, 569, 348/565; H04N 5/445, 5/262, 5/265, 5/44, 5/45, 5/222

[56] References Cited

U.S. PATENT DOCUMENTS

| | | | |
|---|---|---|---|
| 4,959,721 | 9/1990 | Micic et al. | 358/194.1 |
| 4,991,012 | 2/1991 | Yoshino | 348/565 |
| 5,146,210 | 9/1992 | Herberle | 358/194.1 |

FOREIGN PATENT DOCUMENTS

| | | | |
|---|---|---|---|
| 0403116 | 12/1990 | European Pat. Off. | G06F 3/023 |
| 21379 | 1/1987 | Japan | H04N 5/445 |
| 3088159 | 4/1991 | Japan | G11B 15/02 |
| 5075944 | 3/1993 | Japan | H04N 5/445 |
| 9206562 | 4/1992 | WIPO | H04N 7/087 |

*Primary Examiner*—James J. Groody
*Assistant Examiner*—Glenton B. Burgess
*Attorney, Agent, or Firm*—Jay H. Maioli

[57] ABSTRACT

An image display apparatus has a manually operable inputting device such as a remote controller. A predetermined function, for example, as a picture-in-picture is allocated to a predetermined area of a screen of a CRT display. When a cursor is located in the predetermined area by a mouse remote controller and a setting key of the mouse remote controller is clicked, a CPU executes the function allocated to the predetermined area.

7 Claims, 3 Drawing Sheets

IMAGE DISPLAY APPARATUS

This is a continuation of application Ser. No. 08/070,955 filed Jun. 4, 1993.

BACKGROUND OF THE INVENTION

1. Field of the Invention

This invention relates to an image display apparatus such as, for example, a television receiver.

2. Description of the Related Art

Some of recent television receivers have a picture-in-picture function wherein a child picture is displayed in a parent picture, a picture-out-picture function wherein a child picture is displayed outside a parent picture, or a menu displaying function. A television receiver having a function of swapping a parent picture and a child picture is also known and disclosed, for example, in Japanese Patent Application No. Heisei 4-6104.

In conventional television receivers, in order to realize the picture-in-picture function, the picture-out-picture function or the menu displaying function, one of the keys provided on a remote controller to which the function is allocated is manually operated. Since those keys are provided on the remote controller, conventional television receivers are disadvantageous in that the remote controller is complicated in construction and also in operation.

SUMMARY OF THE INVENTION

It is an object of the present invention to provide an image display apparatus wherein a manually operable inputting device such as a remote controller is simple in construction and also in operation.

In order to attain the object described above, according to the present invention, there is provided an image display apparatus, which comprises a display screen having a predetermined area to which a predetermined function is applied, indication means for indicating the predetermined area of the display screen, and control means for realizing the predetermined function when the predetermined area of the display screen is indicated by the indication means. The predetermined function may be a picture-in-picture function for displaying a child screen in a parent screen, a picture-out-picture function for displaying a child screen outside a parent screen, or a menu recalling area. The indication means may be a mouse remote controller.

In the image display apparatus, if the predetermined area of the display screen is indicated by the indication means, then the control means realizes the function allocated to the predetermined area indicated by the indication means. Accordingly, the inputting operation is simple. Further, since a manually operable input means such as a remote controller can be used for the indication means, the manually operable input means can be simplified in construction.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
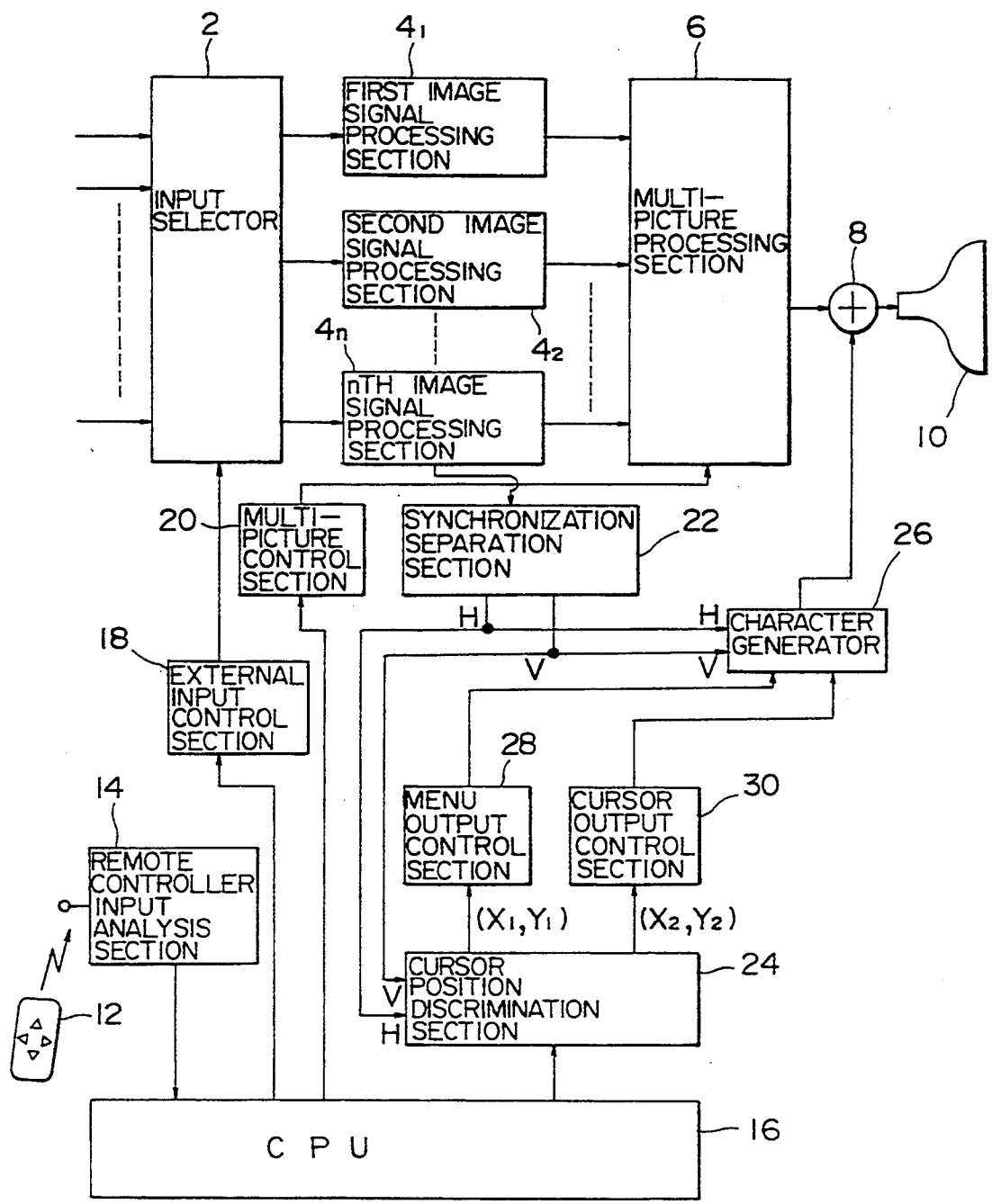
FIG. 1 is a block diagram of an image display apparatus showing a preferred embodiment of the present invention.

Referring first to FIG. 1, there is shown an image display apparatus to which the present invention is applied. The image display apparatus shown includes an input selector 2 which selects, from among a plurality of television signals including a television signal or signals of ground broadcasting, a television signal or signals of broadcasting via satellite and/or some other signals, a maximum number of television signals selected by an external input control section 18 and supplies the selected television signals to first, second, . . . and nth image signal processing sections $4_1$, $4_2$, . . . and $4_n$, respectively. Here, n is an integer equal to or greater than 2, and for example, in the present embodiment, n is set to 4. The first, second, and nth image signal processing sections $4_1$, $4_2$, . . . and $4_n$ individually process the television signals inputted thereto so as to allow the television signals to be displayed and output the thus processed television signals to a multi-picture processing section 6.

The multi-picture processing section 6 performs processing of the television signals received from the first, second, . . . and nth image signal processing sections $4_1$, $4_2$, . . . and $4_n$, which is necessary to allow the picture-in-picture function or the picture-out-picture function, under the control of a multi-picture control section 20. The multi-picture processing section 6 supplies the thus processed signal to one of a pair of inputs of an image signal composition section 8. A signal representative of a figure or a character or characters necessary to display a cursor or a menu is supplied from a character generator 26 to the other input of the image signal composition section 8. The image signal composition section 8 composes the signal from the multi-picture processing section 6 and the signal from the character generator 26 and outputs the thus composed signal. A CRT (cathode ray tube) display section 10 displays thereon the signal received from the image signal composition section 8.

Figure 2:
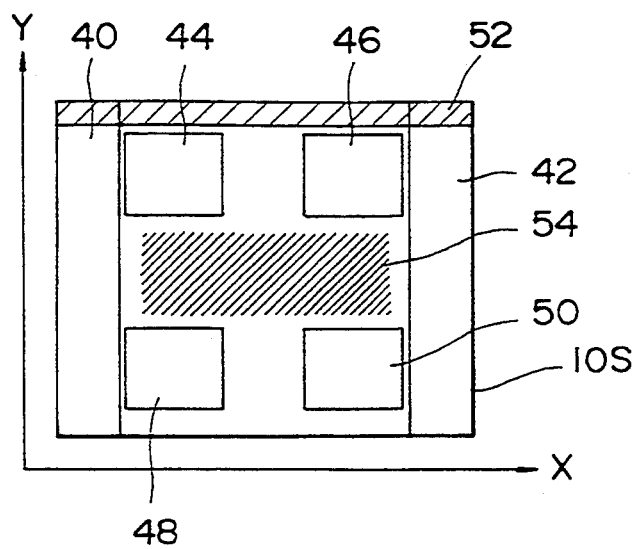
FIG. 2 is a diagrammatic view showing a display screen of the image display apparatus of FIG. 1.
Figure 3A:
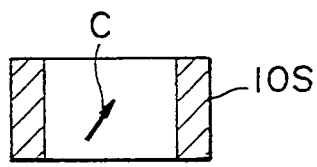
FIGS. 3(a) to 3(d) are diagrammatic views illustrating a procedure wherein a picture-in-picture function is executed in the image display apparatus of FIG. 1.
Figure 3B:
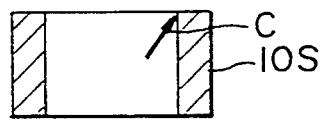
Figure 3C:
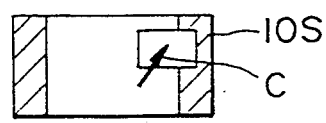
Figure 3D:
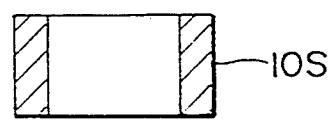

A display screen 10S (FIG. 2 et seq.) of the CRT display section 10 has several functions allocated to predetermined areas thereof as seen from FIG. 2. In particular, referring to FIG. 2, the picture-out-picture function is allocated to each of a left end area 40 and a right end area 42 of the display screen 10S; the picture-in-picture function is allocated to each of a left upper corner area 44, a right upper corner area 46, a left lower corner area 48 and a right lower corner area 50 of a central area of the display screen 10S; the menu recalling displaying function is allocated to an upper end area 52; and a stop (freeze mode) function is applied to a central area 54.

A mouse remote controller 12 shown in FIG. 1 can move a cursor displayed on the screen 10S in a direction indicated by an arrow mark X in FIG. 2 or another direction indicated by another arrow mark Y in FIG. 2 by depression of a suitable one of a plurality of buttons provided thereon. If a setting key on the mouse remote controller 12 is clicked when the cursor is located in one of the areas 40 to 54, then the function allocated to the area in which the cursor is located is selected. The mouse remote controller 12 further has thereon a button for selecting a channel of a television signal for which the picture-in-picture function or the picture-out-picture function is to be used.

A remote controller input analysis section 14 receives an optical signal outputted from the mouse remote controller 12, analyzes a direction and a distance of movement of the cursor and a selected channel indicated by operation of the mouse remote controller 12, and outputs signals representative of results of the analysis to a CPU (central processing unit) 16.

The CPU 16 supplies, in response to such input signal from the remote controller input analysis section 14, a signal representative of the selected channel to the external input control section 18. The external input control section 18 controls the input selector 2 to select a television signal corresponding to the received signal representative of the selected channel.

The CPU 16 further receives signals representative of a direction and a distance of movement of the cursor from the remote controller input analysis section 14, and when it determines that the cursor is located in the area 40 or 42 of the screen 10S, it instructs the multi-picture control section 20 to display a child screen in the area in which the cursor is located, that is, to use the picture-out-picture function. The multi-picture control section 20 thus controls the multi-picture processing section 6 to do this. On the other hand, when the CPU 16 determines that the cursor is located in one of the areas 44, 46, 48 and 50 of the screen 10S, it instructs the multi-picture control section 20 to display a child screen in the area in which the cursor is located, that is, to use the picture-in-picture function. The multi-picture control section 20 thus controls the multi-picture processing section 6 to do this.

A synchronization separation section 22 separates a horizontal synchronizing signal H and a vertical synchronizing signal V from a television signal processed by the first, second, . . . or nth video signal processing section $4_1$, $4_2$, . . . or $4_n$ and outputs them to a cursor position discrimination section 24 and the character generator 26.

On the other hand, the CPU 16 outputs a signal representative of the positions of the cursor in the X and Y directions to the cursor position discrimination section 24. When the cursor position discrimination section 24 determines based on the signal representative of the positions of the cursor in the X and Y directions as well as the horizontal synchronizing signal H and the vertical synchronizing signal V that the cursor is located in the menu recalling displaying area 52 of the screen 10S, it outputs a signal representative of a coordinate position (X1, Y1), at which a menu is to be displayed on the screen 10S, to a menu output control section 28.

The menu output control section 28 outputs to the character generator 26 an address signal representative of an address at which characters and figures to be displayed in the menu are stored, and then outputs an enable signal to the character generator 26 at a timing corresponding to the coordinate position (X1, Y1) on the screen 10S.

Meanwhile, the position discrimination section 24 outputs, based on the signal supplied thereto from the CPU 16 and representative of the location of the cursor in the X and Y directions as well as the horizontal synchronizing signal H and the vertical synchronizing signal V supplied thereto from the synchronization separation section 22, a signal representative of a coordinate position (X2, Y2) of the cursor on the screen 10S to a cursor output control section 30.

The cursor output control section 30 outputs to the character generator 26 an address signal representative of an address in which the figure of the cursor to be displayed on the screen 10S is stored, and then outputs an enable signal to the character generator 26 at a timing corresponding to the coordinate position (X2, Y2) on the screen 10S.

Subsequently, operation of the image display apparatus of FIG. 1 will be described with reference to FIGS. 3(a) to 3(d) which illustrate a procedure in which the picture-in-picture function is executed with the image display apparatus. It is assumed that the user first operates the mouse remote controller 12 manually to move the cursor C from the position shown in FIG. 3(a) into the area 46 to which the picture-in-picture function is allocated as seen from FIG. 3(b) and then clicks the setting key of the mouse remote controller 12.

The remote controller input analysis section 14 receives an optical signal outputted from the mouse remote controller 12, analyzes a direction and a distance of movement of the cursor indicated by the manual operation of the mouse remote controller 12 as well as a selected channel, and outputs signals representative of results of the analysis to the CPU 16.

The CPU 16 supplies, in response to the input signal thereto from the remote controller input analysis section 14, a signal representative of the selected channel to the external input control section 18. The external input control section 18 thus controls the input selector 2 to select a television signal corresponding to the signal representative of the selected channel.

Meanwhile, the CPU 16 determines that the cursor is located in the area 46 of the screen 10S, and instructs the multi-picture control section 20 to display a child screen in the area 46 in which the cursor is located, that is, to use the picture-in-picture function. The multi-picture control section 20 thus controls the multi-picture processing section 6 to do this. Consequently, the television signal of the selected channel is displayed as a child screen in the area 46 of the screen 10S as seen from FIG. 3(c). Thereafter, if the user clicks the setting key of the mouse remote controller 12 while the cursor is located in the area 46, this is detected by the remote controller input analysis section 14, and in response to this, the CPU 16 instructs the multi-picture control section 20 to end the picture-in-picture function. Consequently, the image of the child screen in the area 46 is turned off as seen from FIG. 3(d).

Subsequently, another operation of the image display apparatus of FIG. 1 will be described with reference to FIGS. 4(a) to 4(e) which illustrates a procedure in which the picture-out-picture function is executed with the image display apparatus. It is assumed that the user first operates the mouse remote controller 12 manually to move the cursor C from the position shown in FIG. 4(a) into the area 42 to which the picture-out-picture function is allocated as seen from FIG. 4(b) and then clicks the setting key of the mouse remote controller 12.

The remote controller input analysis section 14 receives an optical signal outputted from the mouse remote controller 12, analyzes a direction and a distance of movement of the cursor indicated by the manual operation of the mouse remote controller 12 as well as a selected channel, and outputs signals representative of results of the analysis to the CPU 16.

The CPU 16 supplies, in response to the input signal thereto from the remote controller input analysis section 14, a signal representative of the selected channel to the external input control section 18. The external input control section 18 thus controls the input selector 2 to select a television signal corresponding to the signal representative of the selected channel.

Meanwhile, the CPU 16 determines that the cursor is located in the area 42 of the screen 10S, and instructs the multi-picture control section 20 to display a child screen in the area 42 in which the cursor is located, that is, to use the picture-out-picture function. The multi-picture control section 20 thus controls the multi-picture processing section 6 to do this. Consequently, the television signal of the selected channel is displayed as a child screen in an area 61 of the screen 10S as seen from FIG. 4(c).

Figure 4A:
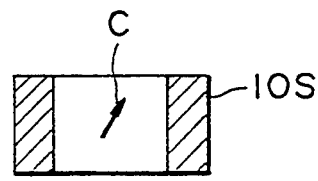
FIGS. 4(a) to 4(e) are diagrammatic views illustrating a procedure wherein a picture-out-picture function is executed in the image display apparatus of FIG. 1.
Figure 4B:
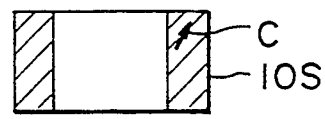
Figure 4C:
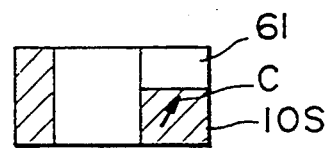
Figure 4D:
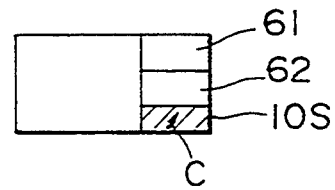
Figure 4E:
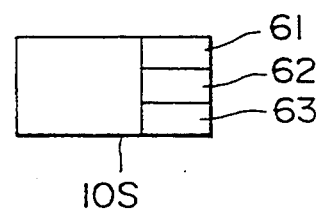

Thereafter, if the user manually operates the mouse remote controller 12 to move the cursor C downwardly to another area 62 below the area 61 and then clicks the setting key of the mouse remote controller 12, a similar operation as described above proceeds in the image display apparatus so that a television signal of the selected channel is displayed as a child screen in the area 62 of the screen 10S as seen from FIG. 4(d). Then, if the user further manually operates the mouse remote controller 12 to move the cursor C further downwardly to a further area 63 below the area 62 and then clicks the setting key of the mouse remote controller 12, then a similar operation as described above proceeds again so that a television signal of the selected channel is displayed as a child screen in the area 63 of the screen 10S as seen from FIG. 4(e).

In this manner, in the image display apparatus of the embodiment shown in FIG. 1, the picture-in-picture function or the picture-out-picture function can be executed by a simple operation of locating the cursor in a predetermined area of the screen.

Having now fully descried the invention, it will be apparent to one of ordinary skill in the art that many changes and modifications can be made thereto without departing from the spirit and scope of the invention as set forth herein.

What is claimed is:

1. An image display apparatus comprising:
   a display screen having predetermined areas for respectively displaying a main picture, a picture-in-picture child picture, and a picture-out-picture child picture;
   an input selector receiving a plurality of input video signals and outputting selected ones of said plurality of video signals for display in response to a selection control signal;
   a controller operable by a user of the image display apparatus for causing a cursor to be displayed in any one of said predetermined areas of said display screen and for selected ones of said plurality of input video signals for display;
   control means responsive to said controller for determining a position of said cursor in one of said predetermined areas of said display screen and producing one of a picture-in-picture control signal and a picture-out-picture control signal based on a determined cursor position and for producing said selection control signal fed to said input selector;
   multipicture control means responsive to said picture-in-picture control signal and said picture-out-picture control signal for producing an image position control signal for causing an image to be displayed in one of said predetermined areas at which said cursor is determined to be positioned by said control means; and
   multipicture processing means receiving said selected ones of said video signals from said input selector and said image position control signal from said multipicture control means for providing at least two video signals to said display screen for display in said predetermined areas in response to said image position control signal.

2. An image display apparatus according to claim 1, further comprising a character generator for generating characters for display on said display screen with said video signals from said multipicture processing means.

3. An image display apparatus according to claim 1, wherein said controller comprises a mouse adapted to be clicked by the user of the image display apparatus.

4. An image display apparatus according to claim 1, wherein said control means comprises a remote controller input analysis system for receiving and decoding signals produced by said controller.

5. An image display apparatus according to claim 4, wherein said control means further comprises a central processing unit receiving channel select and cursor location data decoded by said remote controller input analysis system.

6. An image display apparatus according to claim 5, further comprising an external input control system receiving an input select signal from said central processing unit and producing said selection control signal fed to said input selector.

7. An image display apparatus according to claim 1, wherein said predetermined areas of said display screen includes a menu area for displaying a menu and further comprising a menu output control section for causing a menu to be displayed in said menu area when the cursor is determined to be positioned in said menu area.

* * * * *